Gerald J. Roberts
William H. Edmonds
INVENTORS

BY *J. Preston Swecker*

Their ATTORNEY.

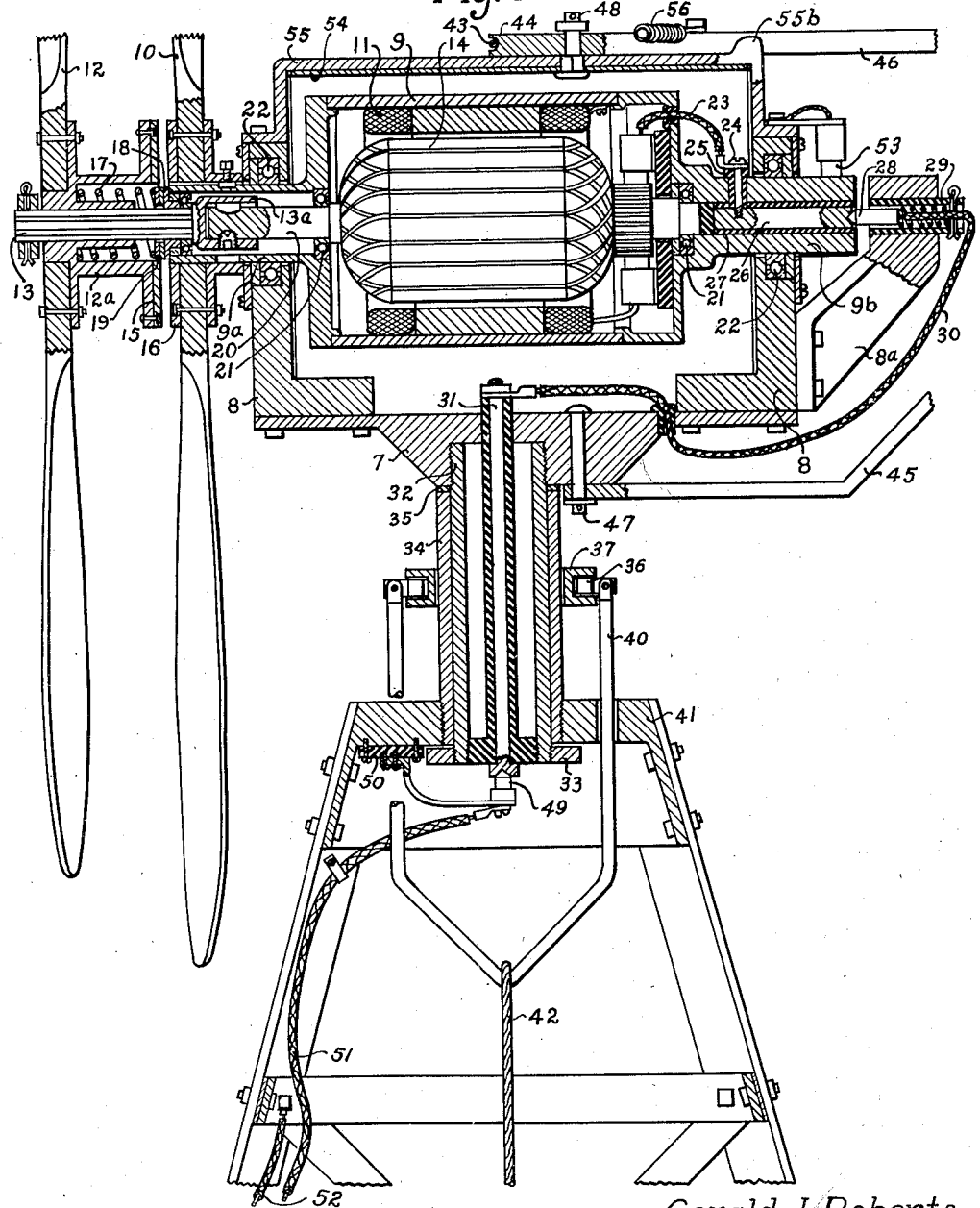

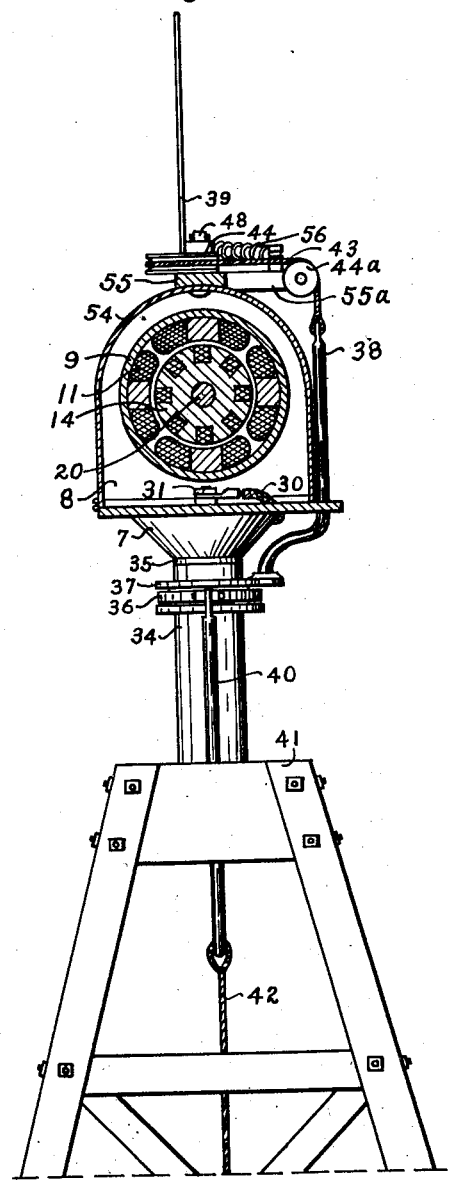

Patented Apr. 4, 1939

2,153,523

UNITED STATES PATENT OFFICE 2,153,523

WIND OPERATED ELECTRIC GENERATOR

Gerald J. Roberts, Quanah, and William H. Edmonds, Goodlett, Tex.; said Edmonds assignor to W. N. Price Application March 25, 1937, Serial No. 133,042

11 Claims. (Cl. 290—55)

This invention relates to improvements in wind operated electric generators.

The primary object of this invention is to provide an improved construction of an electric generator in which the armature is rotated in one direction and the field of the generator is rotated in the opposite direction.

Another object of this invention is to provide in a dual propeller wind operated electric generator for automatically retarding the rotation of the propellers when the wind velocity attains a predetermined pressure.

Still another object of the invention is to provide a yielding mounting for one propeller with a spring tension regulating means whereby a spring and the coacting mount at an end thereof rotates in unison, thereby preventing the twisting of the spring and providing said spring with adjustment means.

Yet another object of this invention is to provide for the use of regulation field coil and armature.

Another object of this invention is to provide for taking the electric current generated at an axial point of the generator.

While the drawings illustrate a preferred embodiment of the invention, it is to be understood that the design may be varied and changes in the minor details may be resorted to to meet specific needs and requirements, within the scope of the invention as claimed without departing from the spirit thereof.

In the accompanying drawings:

Fig. 3 is a longitudinal section of the invention; and

Fig. 4 is a transverse section taken on the line 4—4 of Fig. 1.

Figure 1:
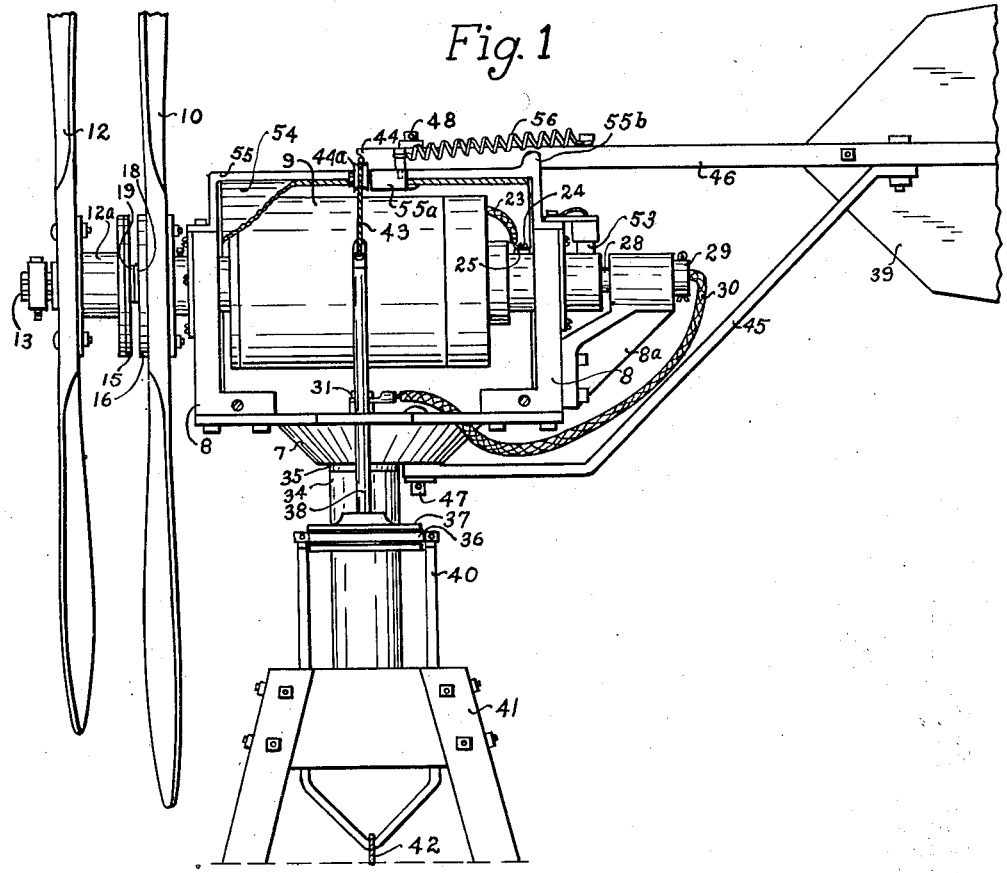
Fig. 1 is a side elevation of the invention with parts broken away.

With more detailed reference to the drawings, the numeral 7 designates a base on which is mounted bearing supports 8. Between these bearing supports 8, a generator housing 9 is rotatably mounted on bearing sleeves 9a and 9b, journaled in anti-friction bearings 22 for free rotation. Attached to bearing sleeve 9a is a propeller 10 which rotates the generator housing 9 in a clockwise direction. Field coils 11 are fixed in the housing 9 and rotate therewith. An armature 14 is mounted within the housing 9, having the usual standard armature shaft 20, journaled in bearings 21 in the housing 9. A spline shaft 13 is arranged in longitudinal alignment with stub shaft 20 and has a bell end 13a keyed to said stub shaft for rotation thereof, said shaft 13 forming an extension of the armature shaft.

A second propeller 12 is slidably mounted on spline shaft 13 and rotates said shaft 13 in a counter-clockwise direction. This shaft rotates the armature 14 in the opposite direction to the rotation of the field coils; therefore if they are rotating at the same speed but in opposite directions their relative speed of rotation is substantially doubled. Due to the shielding effect of the front propeller and the turbulence caused thereby in close relation to the rear one, it has been found advisable to make the rear propeller slightly longer so that it will have access to unimpeded air currents, to give both propellers substantially the same power. The bearings upon which the generator housing and fields are mounted are usually larger and therefore create more friction than the bearing upon which the armature shaft is journaled, which is another reason why the propeller blades should be longer on the rear propeller than on the front propeller.

A clutch plate 15 is carried by a sleeve 12a fixed to the propeller 12 and is arranged in position to coact with a companion clutch plate 16 fixed to propeller 10. A coil spring 17 within the sleeve 12a presses outwardly on the propeller 12 and the sleeve 12a attached thereto normally tending to separate the clutch discs 15 and 16. The spring 17 also bears against a bushing 18 arranged on the spline shaft 13 at the end of the bearing sleeve 9a, said bushing preventing the spring 17 from receiving any twisting strain. Adjustment washers 19 are provided between the spring 17 and the bushing 18 and may be added or removed until the correct operating pressure for the spring 17 is obtained. When the wind pressure on the propeller 12 exceeds the pressure of the spring 17, the propeller 12 is forced inwardly, causing engagement of the clutch discs 15 and 16, retarding relative rotation of the armature and field coils and preventing injury to the generator by excessively high speed rotation.

The generator armature is provided with the usual collectors and brushes. As the current is generated it is conducted by means of wire 23 to a binding post 24 which is in the form of a screw insulated from the surrounding metallic parts by bushing 25. Screw post 24 connects with an axial metal conductor plug 26 which is insulated from the bearing sleeve 9b, by insulating bushing 27. A spring-pressed brush 28 contacts the rotating axial metal plug 26 and picks up the current that is generated by the generator. A bushing 29 insulates the brush 28 from surrounding metal part of a supporting bracket 8a carried by one of the supports 8. An electrical conductor 30 directs the current from brush 28 to an axial bolt 31 that passes through the center of a pivoted mounting for the base 7 of the generator. The pivoted mounting consists of an inner tubular member 32 screwed into base 7 with a nut 33 at the lower end thereof which prevents wind displacement. An outer tubular member 34 surrounds the inner tubular member 32 and a thrust bearing 35 is disposed between the base 7 and the tubular member 34. The outer tubular member 34 is supported by being screwed into the top of a tower 41. By this arrangement free and easy turning of the generating unit is permitted.

Figure 2:
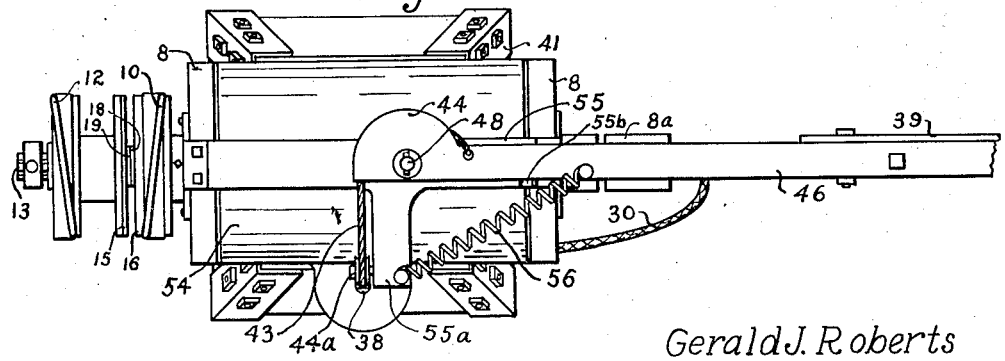
Fig. 2 is a top plan view of the invention with part of the wind vane broken away.

The generator is enclosed by a housing 54 attached to the supports 8, and a supporting bar 55 extends over the housing between the supports 8. A wind vane 39 is carried by a bar 46 pivoted at 48 on the supporting bar 55, and is provided with a brace 45 pivoted at 47 coaxially with the pivot 48. Normally the vane is maintained in a fixed position relative to the generator in alignment with the propellers, by means of a spring 56 extending between bar 46 and an arm 55a (Fig. 2) tending to hold the bar 46 against a stop 55b, for normal operation of the propellers.

However, the vane 39 may be shifted to a position at right angles to the propellers 10 and 12 for non-operation thereof, if desired, by means of a cable 43 operating around a segment 44 and having one end attached to the bar 46 and the other end of said cable extending over a guide 44a to an end of an operating bar 38. The lower end of the bar 38 is attached to a shouldered sleeve 37 slidably mounted on and rotatable on the tubular member 34 for turning movement with the generator unit. A yoke 36 surrounds and engages the sleeve 37 and has a bail 40 attached to opposite sides thereof, said bail 40 being slidable through the top of the tower 41. A cable 42 is connected with the bail 40 for operating the same to act through the yoke 36 and sleeve 37 for pulling on the cable 43 and thereby swinging the vane 39 against the tension of the spring 56 to a position at right angles to the propellers 10 and 12.

A brush 49 is resiliently mounted on an insulated block 50 in tower 41 in bearing contact with axial bolt 31, and a conduit 51 leads from said brush 49 to the desired point where the electricity is to be used. The tower 41 should be grounded, as by a wire 52. A brush 53 is mounted upon support 8 and contacts the generator housing 9, thus providing a positive ground for the generator through the tower.

The field coils and armature are of the usual construction and relation and need not be described in detail. By utilizing end extensions on the armature shaft, a standard armature may be used but extension end plates should be provided for the generator housing.

We claim:

1. In a wind operated electric generator, the combination of generating elements, means mounting said elements for relative rotation, propellers connected respectively with the elements, and means for frictionally reducing excessive relative rotation between the propellers.

2. In a wind operated electric generator, the combination of electric generating elements, means mounting said elements for relative rotation, propellers connected with the respective elements, means mounting said propellers for relative axial movements, and means actuated by said relative axial movements for frictionally reducing the relative rotation of the propellers.

3. In a wind operated electric generator, the combination of electric generating elements, means mounting said elements for relative rotation, a propeller connected with each of said elements for rotating the same independently of the other, means mounting one of said propellers for axial movement relative to the other, and frictional means for reducing relative rotation between the propellers upon said axial movement.

4. In a wind operated generator, the combination of electric generating elements, means mounting said elements for rotation relative to each other, a propeller connected with each of said elements for rotating the same, means mounting one of said propellers for axial movement relative to the other, and clutch elements arranged between the propellers, one of said clutch elements being connected with the movable propeller for movement thereby into engagement with another clutch element to reduce relative rotation between the propellers upon said axial movement of the movable propeller.

5. In a wind operated electric generator, the combination of electric generating elements, means mounting said elements for relative rotation, a wind operated propeller connected with each of said elements for rotating the same, means mounting one of said propellers for axial movement relative to the other, clutch elements connected respectively with the propellers and arranged therebetween in position for frictional engagement upon said axial movement of the movable propeller toward the other to reduce excessive relative rotation of the propellers.

6. In a wind operated electric generator, the combination of electric generating elements, means mounting said elements for relative rotation, a wind operated propeller connected with each of said elements for rotating the same, means mounting one of said propellers for axial movement relative to the other, clutch elements connected respectively with the propellers and arranged therebetween in position for frictional engagement upon said axial movement of the movable propeller toward the other to reduce excessive relative rotation of the propellers, resilient means acting on the movable propeller and normally tending to move the same away from the other propeller, and a wind vane connected with the generator for holding the propellers in the desired position.

7. In a wind operated electric generator, the combination of electric generating elements, means mounting said elements for relative rotation, shafts connected with the respective elements, propellers mounted on the shafts for rotating the elements independently of each other, one of said propellers being mounted for axial sliding movement relative to the other, friction clutch elements connected respectively with the propellers in position for engagement upon said axial movement of the movable propeller, and resilient means acting on the movable propeller normally tending to hold the clutch elements separated.

8. In a wind operated electric generator, the combination of electric generating elements, means mounting said elements for relative rotation, shafts connected with the respective elements, propellers mounted on the shafts for rotating the elements independently of each other, one of said propellers being mounted for axial sliding movement relative to the other, friction clutch elements connected respectively with the propellers in position for engagement upon said axial movement of the movable propeller, resilient means acting on the movable propeller normally tending to hold the clutch elements separated, a bushing mounted on the shaft having the movable propeller in position for bearing of the resilient means against said bushing, and means for adjusting the tension of said resilient means.

9. In a wind operated electric generator, the combination of electric generating field and armature, said armature having an armature shaft, a housing carrying said field and having bearings therein journaling opposite ends of the armature shaft, a field rotating propeller fixed to said housing, an extension shaft in axial alignment with the armature shaft and having a coupling connecting the same with the end of said armature shaft, said extension shaft being journaled in a portion of the housing and a propeller mounted on said extension shaft.

10. In an electric generator, the combination of electric generating elements, means mounting said elements for relative rotation, one of said elements having an armature shaft, a plug arranged in axial alignment with the armature shaft and electrically connected with another of said elements, and a brush bearing against an end of said plug.

11. In an electric generator, the combination of electric generating field and armature having an armature shaft, said field having a sleeve connected therewith, means mounting said field and armature for relative rotation coaxially, an electric plug mounted in the sleeve in axial alignment with the armature shaft and insulated therefrom, means connecting said plug with the field, and a brush contact bearing against the end of said plug.

GERALD J. ROBERTS.
WILLIAM H. EDMONDS.